United States Patent [19]
Slavin et al.

[11] Patent Number: 5,513,673
[45] Date of Patent: May 7, 1996

[54] ELECTRICALLY MODULATED PRESSURE REGULATOR VALVE WITH VARIABLE FORCE SOLENOID

[75] Inventors: Michael Slavin, Caseville; Donald J. West, Warren; John W. Curnow, Utica, all of Mich.

[73] Assignee: Lectron Products, Inc., Rochester Hills, Mich.

[21] Appl. No.: 247,304

[22] Filed: May 23, 1994

[51] Int. Cl.$^6$ .................................................. F15B 13/044
[52] U.S. Cl. ................... 137/625.65; 251/129.08; 251/129.18
[58] Field of Search ............... 137/625.65; 251/129.08, 251/129.18

[56] References Cited

U.S. PATENT DOCUMENTS

| | | | |
|---|---|---|---|
| 3,788,597 | 1/1974 | Icioka | 251/129.18 X |
| 4,250,922 | 2/1981 | Will et al. | 137/625.65 |
| 4,534,375 | 8/1985 | Fox . | |
| 4,567,910 | 2/1986 | Slavin et al. . | |
| 4,809,749 | 3/1989 | Ichihashi | 137/625.65 |
| 4,838,313 | 6/1989 | Kobayashi et al. | 137/625.65 |
| 4,860,792 | 8/1989 | Ichihashi et al. | 137/596.17 |
| 4,947,893 | 8/1990 | Miller et al. . | |
| 4,971,114 | 11/1990 | Ichihashi et al. | 137/625.65 |
| 5,065,979 | 11/1991 | Detweiler et al. . | |
| 5,259,414 | 11/1993 | Suzuki | 137/625.65 |

FOREIGN PATENT DOCUMENTS

4-272587  9/1992  Japan .................. 137/625.65

Primary Examiner—Gerald A. Michalsky
Attorney, Agent, or Firm—Harness, Dickey & Pierce

[57] ABSTRACT

A variable force solenoid valve assembly is provided for use in an automatic transmission controller for controllably reducing a fluid inlet pressure to a desired outlet control pressure. The invention includes a solenoid sub-assembly secured to a valve body sub-assembly. The valve body includes a spool valve having three radially extending lands which translate within a valve body central bore in response to movement of an armature sub-assembly provided in the solenoid sub-assembly. Movement of the spool valve generates first and second flow restriction for controllably regulating the reducing of inlet pressure. In addition, the lands and the central bore comprise two differing diameters for improved outlet pressure regulation. Other various improvements in spool valve design are described including a design which enabled a reduction in the overall size of the solenoid sub-assembly.

18 Claims, 1 Drawing Sheet

ELECTRICALLY MODULATED PRESSURE REGULATOR VALVE WITH VARIABLE FORCE SOLENOID

BACKGROUND OF THE INVENTION

This invention relates generally to fluid control devices and, more particularly, to an electrically-modulated pressure regulator valve with a variable force solenoid.

As is known, solenoid-operated fluid control devices are used in a wide range of electrically controlled systems for controlling the pressure and/or flow rate of fluid discharged from a valve assembly in response to an electrical input signal supplied to a solenoid assembly. In many applications, a valve sub-assembly and a solenoid sub-assembly are integrated into a unitized fluid control device, commonly referred to as a solenoid valve assembly.

In a typical solenoid valve assembly, the solenoid sub-assembly has an armature which acts on, or is coupled to, a valve member in the valve sub-assembly. As is known, movement of the armature is responsive to the magnetic flux generated as a result of the electrical current applied to the electromagnetic windings of the solenoid sub-assembly. Thus, translational movement of the armature causes corresponding translational movement of the valve member for controlling the magnitude of the output pressure of fluid discharged from the valve sub-assembly. More particularly, fluid at an inlet pressure is delivered to an inlet port of the valve sub-assembly such that the position of the valve member regulates an output pressure generated at an output port of the valve sub-assembly as a function of the energized state of the solenoid assembly. Depending upon the particular design of the solenoid assembly, a change in energization level may cause a proportional increase or decrease in the output pressure. Such a proportional device is commonly referred to as a "variable force" solenoid valve assembly or "VFS". One example of a conventional variable force solenoid valve assembly is disclosed in commonly owned U.S. Pat. No. 4,947,893 wherein the axially movable armature of the solenoid sub-assembly is coupled to a spool valve that is supported for axial sliding movement within the valve sub-assembly. As is also disclosed in the above-referenced patent, it is common to provide a biasing spring to urge the spool valve in a predetermined direction.

In a typical solenoid valve assembly, an electrical conductor is wound around a bobbin through which is positioned in the radial center an armature displaceable relative to the bobbin in accordance with an electrical signal applied to the electrical conductor. Components having magnetically conductive properties may be arranged in proximity to the coil and armature assembly to provide a flux path therebetween. In one exemplary variable force solenoid configuration, an armature is retained for translational movement within a central bore of a bobbin on which an electrical coil is wound such that the armature is moveable in a first direction in accordance with an electrical signal applied to the coil and is normally biased in the opposite direction in accordance with the preload exerted thereon by a coil spring. The coil spring is disposed within a common longitudinal bore formed in the armature and bobbin with one end seated against the armature and the other end seated against a spring adjustment screw. The position of the spring adjustment screw can be selectively varied for calibrating the amount of preload exerted on the armature.

The presence of a biasing spring in a central bore of the armature presents some important design considerations. First, because the biasing spring must exert a sufficient biasing force to cause translational movement of the armature, which generally affects corresponding movement of the valve mechanism against mechanical fluid pressure, the armature typically requires an enlarged diameter in order to accommodate a sufficiently forceful biasing spring. Unfortunately, increasing the diameter of the armature consequently requires inducing a greater magnetic field therethrough to effect the same force as in a more compact armature/solenoid design. In turn, such an increase in the magnetic field requires a commensurate increase in either the number of coil windings or the electrical energy applied to the coil, or both. Generally, solenoid designers increase the number of turns of the coil winding, resulting in a solenoid assembly of even greater size, primarily to accommodate the armature-biasing spring. Thus, it is particularly desirable to provide a spring-biasing arrangement which alleviates this resultant increase in armature size and the related solenoid assembly components.

Furthermore, in order to calibrate variable force solenoid assemblies, secondary air gaps require adjustment via threaded magnetic elements in order to regulate the primary and secondary flux paths traversing the magnetic solenoid circuit and to provide a desired output pressure in response to a predetermined applied voltage. In typical variable force solenoid assemblies, it is also necessary to calibrate the biasing force of the spring as well, which is effected through adjustment of a spring adjustment screw. Such a design requires an iterative calibration process in which the spring-biasing force is first adjusted, followed by adjustment of the air gap to vary the flux path, followed by recalibration of the spring biasing force which is often displaced while calibrating the working air gap. While variable force solenoid assemblies described herein are accurately and sufficiently calibratable, the calibration process described herein requires additional manufacturing processes. Thus, it is further desirable to provide a variable force solenoid valve assembly in which the working air gap adjustment and the spring-biasing means are independently adjustable to provide more accurate and faster calibration.

SUMMARY OF THE INVENTION

The present invention discloses a solenoid valve assembly including a valve having a dual diameter spool valve for improved output fluid pressure control. The dual diameter spool valve includes a differential area on which output fluid pressure variations exert a force for displacing the spool valve and enabling improved regulation of output pressure. In another aspect of this invention, the solenoid valve assembly includes a solenoid sub-assembly in which a biasing spring acts on the spool valve in the valve sub-assembly, which translates in concert with the armature of the solenoid sub-assembly. Such an arrangement permits a significant size reduction of the solenoid sub-assembly.

According to a preferred embodiment of the present invention, the solenoid valve assembly includes a solenoid sub-assembly having a movable armature assembly adapted to translate within the solenoid sub-assembly in response to an electrical input signal. In addition, the valve sub-assembly includes a valve body having first and second diameters and which defines an outlet port and a central bore axially aligned with the armature. The valve body fluidly communicates with the outlet port and includes an undercut in the central bore in proximity to the outlet port. Within the valve body, a spool valve is secured to the armature for translational movement. The spool valve has a stem and lands having diameters substantially the same as the valve body first and second diameters. The lands comprise a first land of a first diameter, a differential second land of both the first and second diameters, and a third land of the second diameter. The spool valve also defines first, second, and third chambers with the valve body central bore, the first chamber being between the first and second lands, the third chamber being between the second and third lands, and the second chamber being between the differential land and the undercut. A first fluid restriction controllably restricts fluid communication between the first and second chamber, and a second fluid restriction controllably restricts fluid communication between the second and third chambers.

From the subsequent detailed description taken in conjunction with the accompanying drawings and subjoined claims, other objects and advantages of the present invention will become apparent to those skilled in the art.

DETAILED DESCRIPTION OF THE INVENTION

Figure 1:
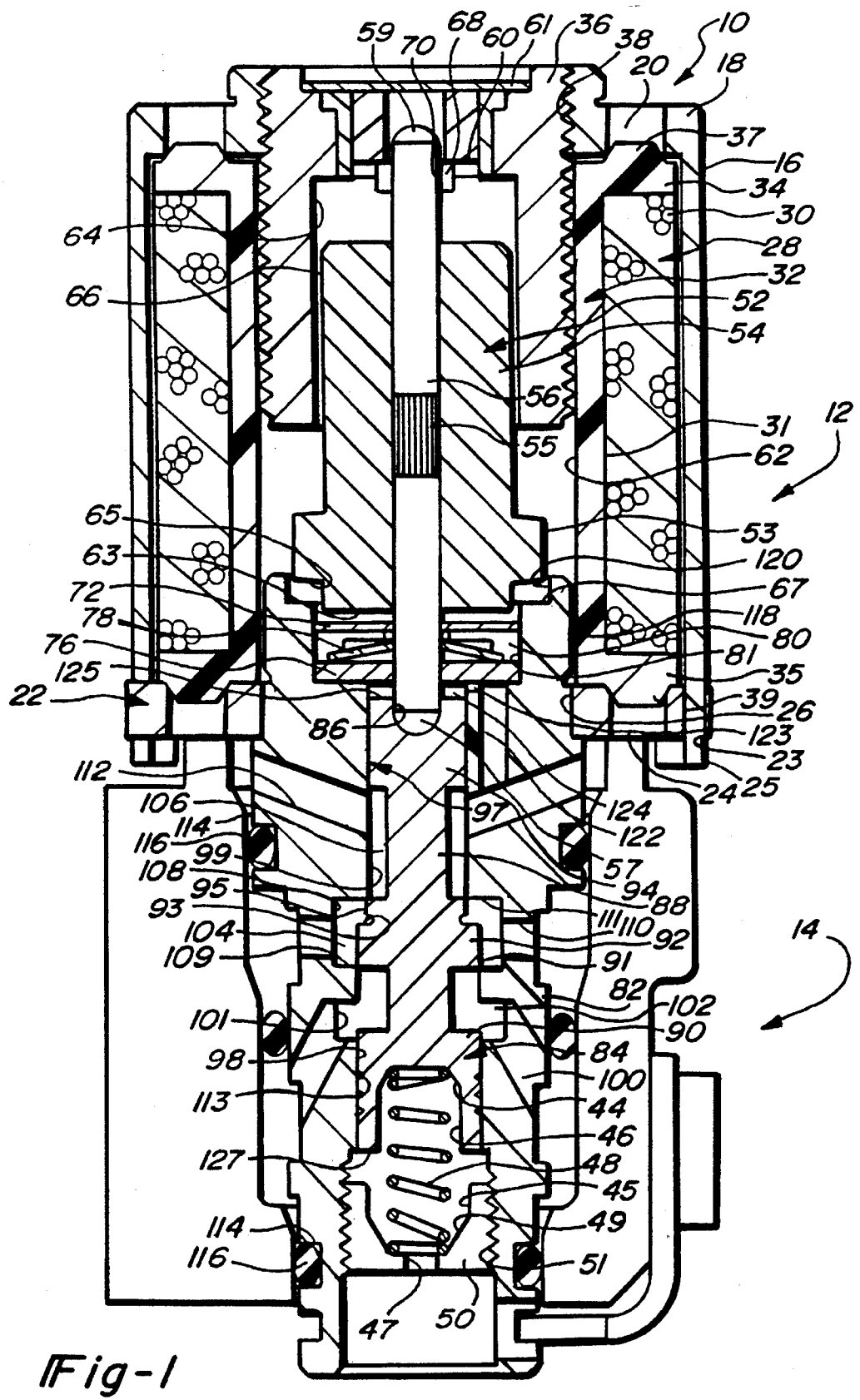
FIG. 1 is a cross-sectional view through a variable force solenoid valve assembly constructed in accordance with a preferred embodiment of the present invention.

A solenoid valve assembly in accordance with this invention is shown in cross-section in FIG. 1, and is generally designated there by reference number 10. In general, solenoid valve assembly 10 is of a type used in a controller assembly for an automatic transmission, such as is disclosed in U.S. Pat. No. 4,678,006, the disclosure of which is hereby incorporated by reference. In operation, variable force solenoid valve assembly 10 receives an electrical input signal from a remote electronic controller unit (not shown) for controllably regulating the fluid pressure within various flow channels of the automatic transmission. Such pressure regulation permits finely tuned calibration of the rate and impact of clutch engagement or "shift-feel", as described in detail in the above-identified reference patent. Because the output fluid pressure is regulated as a function of the magnitude of the electrical current signal, then solenoid valve assembly 10 is of the type generally referred to as a "variable force" solenoid valve assembly or "VFS".

FIG. 1 provides a detailed illustration of the internal working components of the variable force solenoid valve assembly 10. Variable force solenoid valve assembly 10 has two major sub-assemblies consisting of solenoid sub-assembly 12 and valve sub-assembly 14. In the particular embodiment shown, solenoid sub-assembly 12 is enclosed by a cup-shaped tubular housing 16 having a generally closed end 18 with holes 20 formed therein. A disc-like flux collector 22 having a central bore 26 and holes 24 is fixed to the open end of housing 16. More particularly, flux collector 22 is fixed to housing 16 via a plurality of circumferentially spaced tabs 25 which extend through corresponding apertures 23 formed in flux collector 22, with tabs 25 being subsequently rolled during an assembly staking operation. Disposed within housing 16 is an electromagnetic coil assembly 28 comprised of a spool-shaped bobbin 32 on which an electrically-conductive coil 30 is wound. Bobbin 32 is made of an electrically non-conductive and non-magnetic material, such as nylon, and includes a central tubular segment 31 and a pair of radially extending end segments 34 and 35. In addition, raised annular projections 37 and 39 are respectively formed on end segments 34 and 35 and are shown seated within holes 20 and 24 formed in closed end 18 of housing 16 and flux collector 22, respectively. In addition, the terminal ends of coil 30 are electrically connected to a pair of blade-type terminals (not shown). As is conventional, the blade-type terminals are adapted to be electrically connected to the remotely electronic controller unit via a suitable wiring harness (not shown). At the end opposite flux collector 22, screw adjust 36 threadably engages a threaded central bore 38 formed in closed end 18 of housing 16.

Armature assembly 52 comprises a two-piece structure consisting of armature body 54 and an elongated pin 56. Elongated pin 56 is rigidly retained within longitudinal bore 58 via splines 55. Pin 56 has a first end 57 which extends out of armature 54 and is coupled to a valve member of valve sub-assembly 14, as will be described. A second end 59 of pin 56 extends out of armature body 54 and is journally supported for longitudinal movement with armature assembly 52 via a guide bearing 68 that is mounted centrally within transverse surface 60 of screw adjustment plug 36. As will be appreciated, guide bearing 68 has a central bore 70 that is sized to journally support and surround the exterior surface of second end 59 of pin 56 to guide axial movement thereof while inhibiting excessive radial deflection for positioning and maintaining armature assembly 52 for translational movement along the common longitudinal axis of coil assembly 28. In addition, guide bearing 68 is adapted to maintain a relatively uniform radial clearance or "air gap" between the corresponding radial edge surfaces of armature body 54 and adjustment screw 36 during longitudinal movement of armature assembly 52 relative to adjustment screw 36. A welsh cap 61 is provided to enclose end 18 of housing 16.

With continued reference to FIG. 1, armature assembly 52 is shown to be positioned within a longitudinal bore 62 formed in tubular segment 31 of bobbin 32. More particularly, shortened cylindrical portion 53 of armature 54 is coaxially aligned and retained within a central bore 120 formed in an annular extension 118 of valve body 82, to be described further herein, such that armature assembly 54 can move longitudinally with respect thereto. A bearing and diaphragm seal, as will be described herein, is press fit into a recessed bore 81 of annular extension 118 and is adapted to guide longitudinal movement of first end 57 of pin 56 for maintaining a relatively uniform radial air gap between cylindrical portion 53 of armature 54 and valve body 82. Retainer 80 is press fit into recessed bore 81 and maintains guide bearing 76 and diaphragm 78 within annular extension 118. Valve body 82 is made from an electrically conductive material and forms part of the electromagnetic flux circuit of solenoid sub-assembly 12, as will be described. In addition, a non-magnetic spacer 72 is press-fit within recessed bore 81 of annular extension 118. Finally, flux collector 22 is rigidly secured (i.e., press-fit) to valve body 82 such that central bore 26 of flux collector 22 surrounds and engages an outer portion of valve body adjacent to extension 118.

As noted, first end 57 of pin 56 is supported for translational movement via guide bearing 76 which is press fit into recessed bore 81. In addition, non-magnetic spacer 72 is press-fit into recessed bore 81 formed in annular extension 118. Non-magnetic spacer 72 is made of magnetically non-conductive material and is sized and located to contact an end surface 63 of armature 54 so as to prevent radial surface 65 of shortened cylindrical section 53 from contacting a facing shoulder surface 67 of annular extension 118. Thus, the distance between armature surface 65 and shoulder surface 67 defines an axial "air gap" that varies through a predetermined range. In a "de-energized" state, a minimum current level is supplied to coil assembly 28 from the controller unit such that coil spring 48, as will be described, is capable of forcibly displacing armature assembly 52 to the position shown in FIG. 1 for establishing a "maximum" axial air gap between surfaces 65 and 67. In a fully "energized" state, a maximum current level is supplied to coil assembly 28 for generating magnetic flux which exerts a maximum attractive force on armature 54 for moving armature assembly 52 toward annular extension 118 in opposition to the biasing of coil spring 48 to establish a "minimum" axial air gap between surfaces 65 and 67.

To effect translational movement of armature assembly 52, coil assembly 28 is energized in order to induce a magnetic field which travels through a primary flux circuit or path comprising flux collector 22, valve body extension 118, armature body 54, screw adjust 36, solenoid valve assembly housing 16, and then back to flux collector 22. As will be appreciated, each component associated with this flux circuit is made of magnetic material. As in known, completion of the magnetic flux path results in a displacing or attractive being exerted force upon the armature assembly 52 in a generally downward direction with respect to FIG. 1, in opposition to the biasing force exerted by coil spring 48. During controller energization of coil assembly 28, armature assembly 52 translates within bobbin central bore 62, with its longitudinal orientation and radial clearances maintained by guide bearing 68 supporting second end 59 of pin 56 and guide bearing 76 supporting first end 57 of pin 56.

Adjustment screw 36, as noted, is made of magnetic material and provides means for variably adjusting the axial overlap (or air-gap) between armature body 54 and central bore 36 of adjustment screw 36. More particularly, the axial overlap between surface 66 of armature 54 and inner circumferential surface 64 of screw adjust 36 can be adjusted by varying the threaded position of adjustment screw 36 relative to closed end 18 of housing 18, thereby varying the working air-gap.

As is known in the art, it is necessary to control the minimum air-gap distance because the attraction force between the surfaces of an air-gap for a given current flow increases exponentially with decreased air-gap distance. When the separation distances become extremely small, a change in state of the solenoid valve assembly following de-energization becomes less reliable if any residual magnetism is present whenever no electrical current is flowing through the coil assembly 28. Moreover, direct contact or excessively small air-gap distances are to be avoided because it can detrimentally affect the operating characteristic for the variable force solenoid valve assembly. Thus, non-magnetic spacer 72 is press fit into recessed bore 81 onto retainer 80 to regulate the minimum air gap.

In addition to the above, variable force solenoid valve assembly 10 includes a mechanism for exerting an adjustable compliant loading onto armature assembly 52 which opposes the attractive force generated through energization of coil assembly 28. In particular, by adjustably changing the position of spring adjustment screw 50, a variation in the biasing force exerted by coil spring 48 is established due to a change in the pre-compression of coil spring 48.

In accordance with yet another feature of this invention, the "self-balancing" fluid control components associated with valve sub-assembly 14 of variable force solenoid valve assembly 10 are shown in FIG. 1. As noted, variable force solenoid valve assembly 10 is operable to control the fluid pressure discharged from valve sub-assembly 14 in response to the electrical current signal applied to coil assembly 28. Such control is achieved by selectively regulating the outlet pressure by restricting fluid flow and venting or "bleeding" fluid to a sump.

In solenoid design, it is also desirable to compensate for various damping forces acting upon the valving during operation which can cause vibrational instability. Such damping forces include frictional, viscous, magnetic (in solenoid applications), and hydraulic forces. It is further desirable to stabilize the vibrational or oscillatory characteristics of the valving which results in decay or attenuation of the amplitude of vibration with time. Attenuation of vibration amplitude is provided, according to the preferred embodiment of this invention, through the utilization of flow control components designed to be self-balancing so as to readily attain equilibrium conditions during operation.

This unique "self-balancing" valve sub-assembly will now be described. Valve sub-assembly 14 primarily comprises valve body 82, spool valve 84, coil spring 48, and spring adjust 50. Spool valve 84 has a central stem 88 and first, second, and third lands 90, 92, and 94 respectively, which extend radially from central stem 88. As seen, second land 92 is stepped to include a smaller segment 95 and a larger segment 91 joined by radial differential surface 93. Valve body 82 has a central longitudinal bore 97 axially aligned with armature assembly 52 and which is defined by a first bore segment 98 and a second bore segment 99, each having different diameters. In general, first land 90 is positioned for sliding movement in first bore segment 98 while third land 94 is positioned for such movement within second bore segment 99. Valve body 82 also includes a first undercut segment 101 formed in first bore segment 98, and a second undercut segment 108 formed between first bore segment 98 and second bore segment 99. Second land 92 is shown positioned for sliding movement within second undercut 108. Valve body 82 further defines one or more radially extending inlet passages 100 which communicate from the external surface of valve body 82 to a first or inlet chamber 102 which is exposed to fluid at inlet pressure. Chamber 102 is defined by the volume between first spool valve land 90, second valve land 92, first bore segment 98 and first undercut 101. A second or control chamber 104 is primarily defined by the volume between valve body second undercut 108 and spool valve second land 92. A third or exhaust chamber 106 is provided within second bore segment 99 of valve body 82 between second spool valve land 92 and third spool valve land 94. One or more radially extending outlet passages 110 communicate with second fluid chamber 104 at outlet fluid pressure. One or more radially extending passages 112 provide fluid communication between third chamber 106 and a transmission sump (not shown). Moreover, a plurality of small pressure rings 113 are circumferentially disposed around the outer diameter of inlet compensator spool 84 and provide a more uniform distribution of forces resulting from the close clearance fit of inlet compensator spool 84 and a portion of central bore 97 of valve body 82.

First end 57 of pin 56 of armature assembly 52 is in press-fit engagement with spool valve 84 via a bore 86 provided at the upper end of third land 94. This engagement permits spool valve 84 to move in concert with armature assembly 52. At the other end of spool valve 82, coil spring 48 is shown to have a first end engaging a tapered shoulder 44 of a chamber 46 formed in first land 90 and a second end engaging a tapered shoulder 49 of a chamber 45 formed in spring adjust 50. Coil spring 48, as described above, exerts a preload on spool valve 84 for biasing it and armature assembly 52 upwardly with respect to FIG. 1. Coil spring 48 is compliantly adjusted by threading spring adjust 50 into central threaded bore 51 of valve body 82. Spring adjust 50 also includes an orifice 47 which is vented to a transmission sump (not shown).

Close clearance between lands 90, 92, and 94 of spool 84, and central bore 97 provides a fluid seal therebetween to prevent direct fluid flow between fluid chambers 102, 104, and 106. The external peripheral surface of valve body 82 includes annular grooves 114 having seals 116 disposed therein. Annular extension of 118 of valve body 82 is received in a central bore 26 of flux collector 22 via press fitted engagement. Valve body 82 also includes axial passageway 122 and radial passage 123 which provide fluid communication between radial passage 112 and a chamber 124 defined as the volume between guide bearing 76 and an upper surface 125 of spool valve third land 94. This axial passageway remains at exhaust pressure so that the pressure applied to an end surface 127 of first land 90 and upper surface 125 of third land 94 of spool valve 84, fluid chamber 124, and fluid chamber 126 are at equal pressures.

Inlet compensator spool 84 modulates the fluid pressure entering valve body 14 at radial inlet passages 100 by varying the overlap between large segment 91 of second land 92 and the lower edge 109 of undercut 108. This overlap meters fluid flow at inlet pressure from first chamber 102 to second chamber 104. Thus, the outlet fluid pressure measured at outlet passages 110 varies in accordance with the metered inlet pressure and the metered exhaust pressure, to be described. The metered exhaust pressure varies in relation to the exhaust fluid flow which varies in accordance with the overlap between an upper radial edge 111 of second undercut 108 and smaller segment 95 of second land 92.

According to a first aspect of this invention, utilization of a three land spool valve 84 interactively with fluid flow passages 100, 110, and 112, as configured in valve body 82, generates positive hydraulic damping characteristics during fluid flow conditions. Positive damping promotes self-balancing characteristics which tend to attenuate unstable spool valve vibration or oscillation commonly realized in variable force solenoid valves employing spool valves having two lands. Spool valve 84 attenuates the amplitude of spool valve oscillation during changing flow conditions so as to provide a stable, controllable valve body assembly 14 during dynamic flow conditions and static equilibrium conditions. According to a second aspect of this invention, removal of a coil spring from armature sub-assembly 52, where biasing springs typically are located, and placing it in valve sub-assembly 14 enables a more compact solenoid design. Armature body 54 thus has a smaller diameter because it is no longer necessary to accommodate a spring seat. This compacted configuration provides more efficient magnetic conductivity between armature assembly 52 and coil assembly 28 because the volume over which the magnetic field translates is significantly decreased. Further, coil assembly 28 may be made smaller since less magnetic field needs to be induced to generate an equal force.

According to another aspect of this invention, the three land design of spool valve 84 facilitates improvements in the manufacturing process because the critical overlap dimension between the valve body 82 and spool valve 84 varies strictly in accordance with two dimensions. The first dimension is the length of second undercut 108, and the second dimension is the length of spool valve second land 92. In addition to the enhanced manufacturing processes, the spool valve configuration described herein reduces assembly stack-up considerations because alignment is controlled through detail dimensions rather than gross dimensions.

According to yet another aspect of this invention, the flow path from first chamber 102 to second chamber 104 and outlet passage 110 provides an inside to outside flow path which, in accordance with the differential between larger segment 91 and smaller segment 95 of second valve land 92, creates a stabilizing fluid flow force.

Operation of the variable force solenoid valve assembly will now be described. Fluid at inlet pressure is provided through inlet passages 100 into first chamber 102. When the solenoid sub-assembly 12 is in a de-energized state (a minimum current is applied), coil spring 48 upwardly biases spool valve 84 and, by virtue of contact with armature pin 56, armature assembly 52 is likewise biased upwardly. This upward biasing force creates a fluid flow passage between fluid chambers 102 and 104 as the overlap between larger diameter segment 91 of differential land 92 and lower edge 109 of undercut 108 is eliminated. This allows the transfer of inlet fluid pressure to radial passages 110, which are at outlet pressure. Further, when solenoid assembly 12 is in a de-energized state, smaller diameter segment 95 of second land 92 substantially overlaps with the upper edge 111 of undercut 108, thereby reducing fluid flow between second fluid chamber 104 and third fluid chamber 106, which is in fluid communication with a transmission sump via radial passage 112.

In order to modulate a reduction of inlet fluid pressure to outlet fluid pressure, coil assembly 28 is energized to effect a magnetic field flow through the magnetic conduction paths as described above to effect a magnetic attraction between armature body 54 and valve body 82. This attraction overcomes the upwardly biasing force of coil spring 48 and results in a generally downward translation of armature assembly 52 and spool valve 84. The downward translation results in an overlap being established between larger diameter segment 91 of stepped second land 92 and the lower edge 109 of undercut 108, resulting in a reduction of fluid flow between first chamber 102 and second chamber 104. The fluid flow reduction modulates a decrease in the outlet fluid pressure at radial passage 110. Further, during energization of coil assembly 28, a downward translation of spool valve 84 also results in an increased fluid flow passage between second chamber 104 and third chamber 106 due to the broken overlap between second land 92, small diameter segment 95, and the upper edge 111 of undercut 104 resulting in a venting of fluid from second chamber 104 to second chamber 106 into transmission sump (not shown) through radial passage 112.

During a steady state output fluid pressure condition, coil assembly 28 is energized to provide a substantially constant downwardly biasing force against the upwardly biasing force of coil spring 48. During such a condition, fluid pressure on the differential surface 93 between larger diameter segment 91 and smaller diameter segment 95 of second land 92 exerts a force for maintaining a relatively constant outlet pressure. Thus, when the outlet fluid pressure changes without varying the energization of coil assembly 28, the increased outlet fluid pressure exerts a generally downward force on spool valve 84 via the differential surface 93 resulting in a generally downward translation. Downward translation restricts fluid flow passage between first chamber 102 and second chamber 104. The downward translation also increases the fluid flow passage between second fluid chamber 104 and third fluid chamber 106 reducing the outlet fluid pressure and compensating for the unrequested increase in outlet fluid pressure. When a decrease in outlet fluid pressure occurs during a desired steady state operation, the opposite effect occurs. Thus, a decrease in the outlet fluid pressure results in a decrease in the generally downwardly biasing force of the outlet fluid pressure on differential surface 93, resulting in an upward translation of spool valve 84. This upward translation increases the fluid flow passage between fluid chamber 102 and fluid chamber 104 and decreases the fluid flow passage between fluid chamber 104 and fluid chamber 106, resulting in a corresponding decrease in outlet fluid pressure. Accordingly, controlled energization of coil assembly 28 enables the fluid pressure of the control pressure to be variably reduced from the non-energized equilibrium pressure in a controlled manner. Stable control of spool valve movement upon controlled energization of coil assembly 28 inhibits natural self-excited oscillation, thereby reducing the time for reaching new equilibrium conditions after controlled energization of coil assembly 28.

During initial assembly and calibration, fluid at inlet pressure is applied through inlet passage 100. With no electrical signal applied to coil assembly 28, spring adjust 50 is adjusted to vary the upward force exerted by coil spring 48 in order to achieve a desired outlet pressure. Next, a voltage signal is applied to coil assembly 28 to provide a predetermined current, preferably 1 amp, while coil spring 48 is maintained as compressed during the previous calibration step. Screw adjust 36 is then adjusted until a desired control pressure is provided at outlet port 110.

While the above detailed description describes the preferred embodiment of the present invention, it will be understood that the present invention is susceptible to modification, variation and alteration without deviating from the scope and fair meaning of the subjoined claims.

What is claimed is:

1. A variable force solenoid valve assembly for controllably reducing a fluid inlet pressure to an outlet control pressure in response to an electrical input signal, comprising:

a solenoid assembly including an energization coil assembly defining a longitudinal bore, an armature disposed in said bore and adapted to translate in response to said electrical input signal energizing said coil assembly, pole means for defining a working air-gap across which magnetic fields are transferred for generating an attractive force between said pole means and said armature which urges said armature to move toward said pole means when said coil assembly is energized, and spring means for normally biasing said armature away from said pole means;

a valve body coupled to said solenoid assembly and including an inlet passage in fluid communication with fluid at said fluid inlet pressure, an outlet passage in fluid communication with fluid at said outlet control pressure, an exhaust passage in fluid communication with a sump, and a central bore axially aligned with said armature and which communicates with each of said passages, said central bore having a first bore segment in fluid communication with said inlet passage, a second bore segment in fluid communication with said exhaust passage, and an undercut segment formed between said first and second bore segments and which is in fluid communication with said outlet passage;

a spool valve disposed within said valve body central bore and secured to said armature for translational movement therewith, said spool valve having a central stem and a plurality of lands extending radially therefrom, said spool valve including a first land retained in said first bore segment to define a first chamber therewith, a stepped second land retained in said undercut to define a second chamber therewith, and a third land retained in said second bore segment to define a third chamber therewith, said first chamber provided between said first and second spool valve lands, said third chamber defined between said second and third spool valve lands, and said second chamber defined between said second land of said spool valve and said undercut;

a first fluid restriction associated with said second spool valve land for controllably restricting fluid communication between said first chamber and said second chamber; and second fluid restriction associated with said second spool valve land for controllably restricting fluid communication between said second chamber and said third chamber;

whereby controlled energization of said coil assembly causes movement of said armature toward said pole means which produces corresponding movement of said spool valve within said valve body central bore for decreasing the flow of fluid through said first fluid restriction and increasing the flow of fluid through said second fluid restriction so as to decrease the outlet control pressure and, deenergization of said coil assembly causes said spring means to urge said armature and said spool valve to move away from said pole means for increasing the flow of fluid through said first fluid restriction and decreasing the flow of fluid through said second fluid restriction so as to increase the outlet pressure.

2. The variable force solenoid valve assembly according to claim 1 wherein said outlet fluid pressure acts on said second and third lands within said third chamber to maintain a relatively constant outlet control pressure.

3. The variable force solenoid valve assembly according to claim 2 wherein:

during a static control mode, an increase in outlet control pressure provides an increased force on said stepped second land for urging said spool valve in a direction to decrease fluid flow through said first fluid restriction and increase fluid flow through said second fluid restriction, thereby resulting in a compensating decrease in outlet control pressure; and during a static control mode, a decrease in outlet control pressure provides a decreased force on said stepped second land for urging said spool valve in a direction to increase fluid flow through said first fluid restriction and decrease fluid flow through said second fluid restriction, thereby resulting in a compensating increase in outlet control pressure.

4. The variable force solenoid valve assembly according to claim 1 wherein said valve body central bore is axially aligned with a central longitudinal axis of said armature such that said armature is coupled to said spool valve third land via a pin member.

5. The variable force solenoid valve assembly according to claim 4 wherein said armature is an assembly including a tubular member having a central bore and said pin member which has a first end permanently secured within said central bore of said tubular member and a second end disposed within a bore provided on an upper surface of said spool valve third land.

6. The variable force solenoid valve assembly according to claim 1 wherein said spool valve includes a bore formed in the outer end surface of said first land and in which said spring means is disposed.

7. A variable force solenoid valve assembly for use in an automatic transmission controller for controllably reducing a fluid inlet pressure to an outlet control pressure in response to an electrical input signal, comprising:

an energization coil assembly defining a central bore;

a movable armature assembly disposed in said central bore and adapted to translate in said central bore in response to energization of said coil assembly;

a first flux collector magnetically coupled to said coil assembly, said first flux collector having adjustment means for varying the length of a saturated air-gap between said armature assembly and said first flux collector across which magnetic fields are transferred to effect a varying magnetic field flow between said armature assembly and said first flux collector;

a second flux collector having a central bore and being disposed below, and adjacent to said coil assembly;

a housing for enclosing said first flux collector, said coil assembly, and said second flux collector;

a valve body coupled to said second flux collector and having a longitudinal bore aligned with said central bore thereof, said valve body longitudinal bore having a first bore segment in fluid communication with an inlet passage, a second bore segment in fluid communication with an exhaust passage, and an undercut segment formed between said first and second bore segments and which is in fluid communication with an output passage;

a spool valve disposed within said valve body longitudinal bore having a central stem and a plurality of lands radially extending therefrom, said spool valve including a first land retained in said first bore segment, a stepped second land retained in said undercut segment, and a third land retained in said second bore segment, whereby a first chamber is defined between said first and second lands within said first bore segment and which is in fluid communication with said inlet passage, a second chamber is defined between said stepped second land and said undercut segment and which is in fluid communication with said outlet passage, and a third chamber is defined between said second and third lands within said second bore segment and which is in fluid communication with said exhaust passage;

means for coupling said spool valve to said armature assembly so as to permit movement of said spool valve within said valve body bore in response to movement of said armature assembly;

spring means disposed between said spool valve and said valve body for urging said armature assembly away from said second flux collector when said coil assembly is de-energized;

a first flow restriction for controllably restricting the flow of fluid between said first chamber and said second chamber; and a second flow restriction for controllably restricting the flow of fluid between said second chamber and said third chamber;

whereby, said control pressure is controllably regulated in response to a resulting force imposed on said spool valve through the interaction of said spring means, the controlled energization and deenergization of said coil assembly and said fluid pressure acting on said spool valve within said chambers.

8. The variable force solenoid valve assembly according to claim 7 wherein said outlet fluid pressure exerts a force within said second chamber that interacts with said second land to maintain a relatively constant outlet control pressure.

9. The variable force solenoid valve assembly according to claim 7 further comprising spring adjust means for varying the compliant force of said spring means acting on said armature assembly.

10. The variable force solenoid valve assembly according to claim 9 wherein said spring adjust means comprises an adjustment screw threaded into a threaded portion of said valve body longitudinal bore, said adjustment screw having a spring seat end for engaging said spring means whereby movement of said adjustment screw acts to vary the compliant force of said spring means.

11. The variable force solenoid valve according to claim 7 wherein said adjustment means further comprises a magnetic adjustment plug threaded into a central threaded bore provided in said first flux collector for varying said saturated air-gap between said armature assembly and said adjustment plug.

12. The variable force solenoid valve assembly according to claim 7 wherein said armature assembly comprises a tubular member having a central bore and a pin member having a first end permanently secured within said central bore of said tubular member and a second end disposed within a bore formed in an upper surface of said spool valve third land.

13. The variable force solenoid valve assembly according to claim 12 wherein said second end of said pin member extends longitudinally into said valve body longitudinal bore and is affixed to said spool valve at a surface of said third land opposite said stem, said engagement of said spool valve to said armature assembly providing low friction means for reducing the frictional drag forces acting on said armature assembly and said spool valve during movement thereof.

14. The variable force solenoid valve assembly according to claim 7 wherein:

during a static control mode, an increase in outlet control pressure in said second chamber causes an increased force to be exerted on a first portion of said stepped second land for urging said spool valve in a direction to decrease fluid flow through said first fluid restriction and increase fluid flow through said second fluid restriction, thereby resulting in a compensating decrease in said outlet control pressure; and during a static control mode, a decrease in said outlet control pressure causes a decreased force to be exerted on a second portion of said stepped second land for urging said spool valve in a direction to increase fluid flow through said first fluid restriction and decrease fluid flow through said second fluid restriction, thereby resulting in a compensating increase in said outlet control pressure.

15. The variable force solenoid valve assembly according to claim 7 wherein said first flow restriction is defined by the overlap of said second spool valve land and said valve body between said first chamber and said second chamber.

16. The variable force solenoid valve assembly according to claim 15 wherein said second flow restriction is defined by the overlap of said second land of said spool valve and said valve body between said second chamber and said third chamber.

17. The variable force solenoid valve assembly according to claim 16 wherein energization of said coil assembly generates an electromagnetic attracting force such that said armature assembly and said spool valve move in the direction of said valve body to increase said first fluid restriction between said first chamber and said second chamber and decrease said second fluid restriction between said third chamber and said second chamber to effect a decrease in said outlet fluid pressure.

18. The variable force solenoid valve assembly according to claim 17 wherein, upon deenergization of said coil assembly, said spring means urges said armature assembly in the direction of said first flux collector such that said armature assembly and said spool valve move in a direction away from said valve body so as to decrease said first fluid restriction between said first chamber and said second chamber and increase said second fluid restriction between said third chamber and said second chamber to effect an increase in said outlet fluid pressure.

* * * * *